(No Model.)
A. W. PERCY.
CHECK REIN.
No. 248,563.　　　　　　　Patented Oct. 18, 1881.
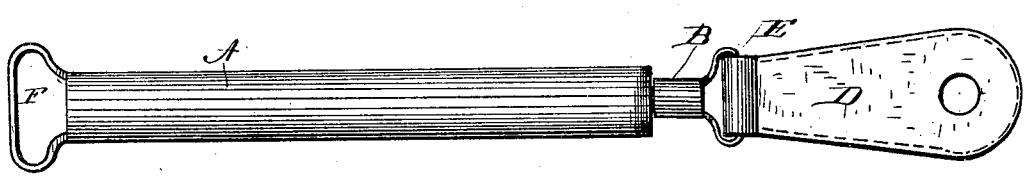
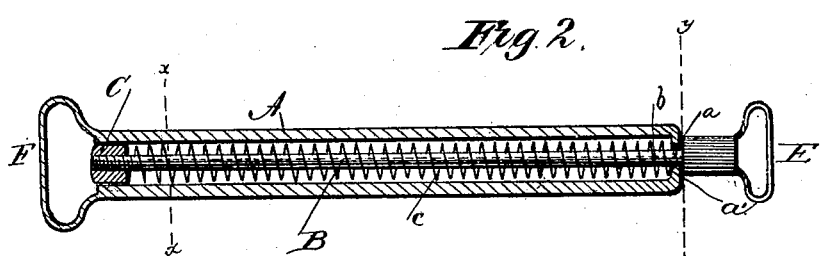
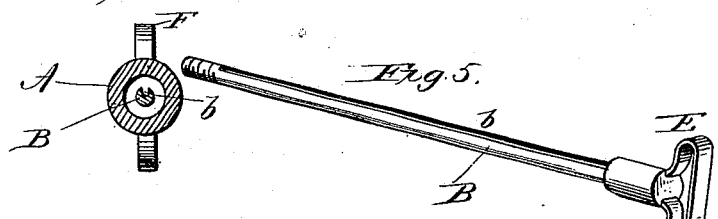
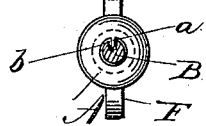
Witnesses,
Franck L. Ourand
H. B. Bayly
Inventor:
Albert W. Percy
By
Frank A. Fouts
Attorney

UNITED STATES PATENT OFFICE.

ALBERT W. PERCY, OF INDEPENDENCE, KANSAS, ASSIGNOR TO CHARLES A. HULL, OF SAME PLACE.

CHECK-REIN.

SPECIFICATION forming part of Letters Patent No. 248,563, dated October 18, 1881.

Application filed July 25, 1881. (No model.)

*To all whom it may concern:*

Be it known that I, ALBERT W. PERCY, of Independence, in the county of Montgomery and State of Kansas, have invented certain new and useful Improvements in Check-Reins; and I do hereby declare that the following is a full, clear, and exact description of the invention, which will enable others skilled in the art to which it appertains to make and use the same, reference being had to the accompanying drawings, which form a part of this specification.

Figure 1 is a plan view of my spring tug-link. Fig. 2 represents a longitudinal section. Fig. 3 is a cross-section through the line $x\ x$ in Fig. 2. Fig. 4 is a cross-section through the line $y\ y$; Fig. 5, a perspective view of rod and loop.

My invention consists in an improvement in spring tug-links. It is constructed with a grooved rod, having a depending pin fixed in the cylinder, said pin working in the groove to prevent the rod from turning in the cylinder, which will be more fully hereinafter described.

In the accompanying drawings, A represents a cylinder or case containing a spiral spring, $c$, and rod B, which is threaded to receive the nut C. The spiral spring $c$ encircles the rod B, said spring pressing and being held in its place by the nut C on inside of cylinder and shoulder $a'$.

E is a metallic loop, being connected with and forming part of rod B, the loop E, rod B, and nut C working in concert.

F represents a loop attached to and forming part of cylinder A.

Rod B is provided with a straight groove or depression running from its shoulder to the thread. A small fixed pin is attached to the cylinder-shoulder $a'$ projecting inwardly and fitting into said groove. The rod is thereby permitted to slide in and out, but is prevented from turning in the cylinder. The advantages of this feature of the device are that the rod B is prevented from turning in nut C. Said nut would be constantly coming off by the action of the rod were the latter permitted to turn; and, further, the loops E and F are held in fixed relative positions, thereby preventing the check-rein from turning and crossing. Again, a loose turning motion would be a characteristic of the device were it constructed without the groove and pin, and its value will be enhanced and sale increased by the use of the same.

D represents a leather strap attached to the loop E. The eye in said strap is designed to receive the check-hook, the loop F to be connected with the check-rein, and thereby become a part of it.

Having thus shown and described my invention, I claim as new and desire to secure by Letters Patent—

The spring tug-link consisting of a cylinder provided with a loop at one end and the depending pin or stud at its opposite end, in combination with the grooved rod B, also provided with a loop and shoulder at one end, surrounded by a spiral spring and secured to the cylinder by a suitable nut, substantially as described, and for the purposes set forth.

In testimony that I claim the foregoing as my own I have hereto affixed my signature in presence of two witnesses.

ALBERT W. PERCY.

Witnesses:
WILLIAM DUNKIN,
GEORGE W. BURCHARD.